May 9, 1967   C. A. SOUTHWICK, JR., ET AL   3,318,477
PLASTIC CLOSURES FOR PREFORMED CONTAINER BODIES
Filed March 29, 1965                           2 Sheets-Sheet 1

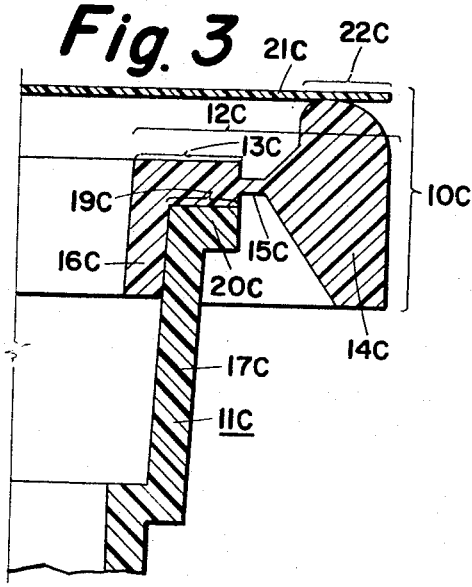
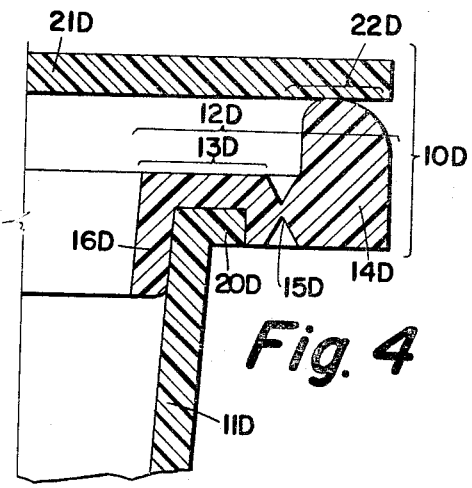
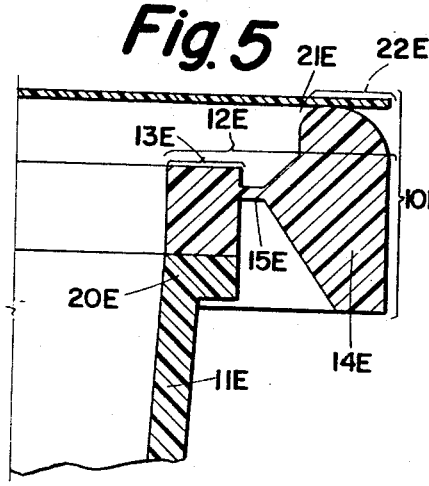
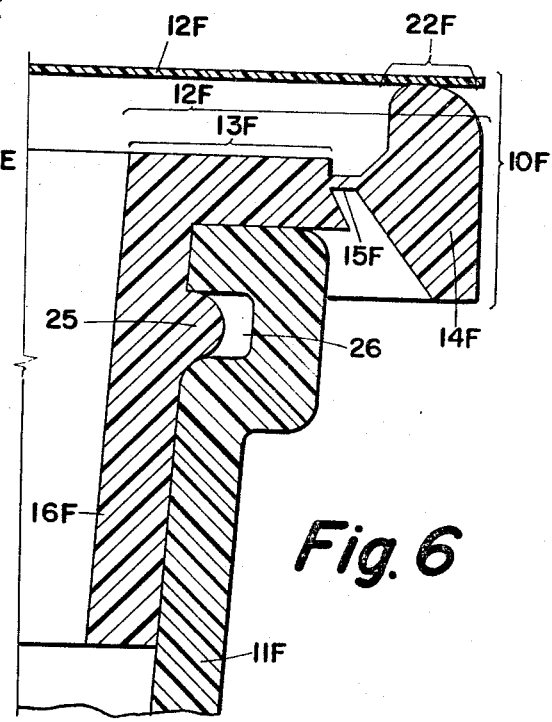

United States Patent Office 3,318,477
Patented May 9, 1967

3,318,477
PLASTIC CLOSURES FOR PREFORMED
CONTAINER BODIES
Charles A. Southwick, Jr., Hope, N.J., and John S. Rynhart, Perkiomenville, Pa., assignors to Plastomatic Corporation, Malvern, Pa., a corporation of Pennsylvania
Filed Mar. 29, 1965, Ser. No. 443,328
12 Claims. (Cl. 220—47)

This invention relates to plastic closures suited for attachment to preformed container bodies made from plastics; from mixtures of plastics and modifying agents, such as waxes and resins derived from coal tar, petroleum or the like; or from materials such as metal, glass, paper, wood or the like coated or laminated with thermoplastic material.

Earlier patents, such as Betner Patent 3,073,477 and Hutchinson Patents 3,048,299 and 3,096,904, disclose container bodies having an integral rim or bead to which a cover element is sealed for protection of the container contents. Original access to the contents of the sealed container is afforded by complete or partial tearing of the rim from the container body, the cover element remaining sealed to the torn-off rim and with it providing a re-usable cover for re-capping of the unsealed container to protect its partially depleted contents or for other storage uses.

By the present invention, all of the advantages of the aforesaid earlier-disclosed containers are attained plus the additional advantages that the selection of the container body material and the method of forming the container body are not limited by the material or by the forming requirements of the tear-off rim or bead. Specifically, in accordance with the present invention, the closure means for a preformed container body comprises a separate plastic collar which has a tear-off rim or bead and a lid whose margin is joined to the tear-off rim of the collar element before or after attachment of such collar element to the container body; alternatively, the lid and collar may be integrally formed with the peripheral area of the lid constituting part of the tear-off rim of the collar. More particularly, the container body may be formed by any of the known processes or techniques including those known as blow-molding, vacuum or pressure thermoforming, injection molding and centrifugal casting. The container body may be of material selected as suited for the particular forming process and for the intended use of the container; such material may be, and usually is, different from the plastic material selected for the closure means.

The invention further resides in closure means having features of novelty and utility hereinafter described and claimed.

For a more detailed understanding of the invention and for illustration of various forms thereof, reference is made in the following description to the attached drawings in which:

FIGS. 2 to 6 are fragmentary sectional views in side elevation and respectively showing other forms of the closure means applied to a preformed container body.

Figure 1:
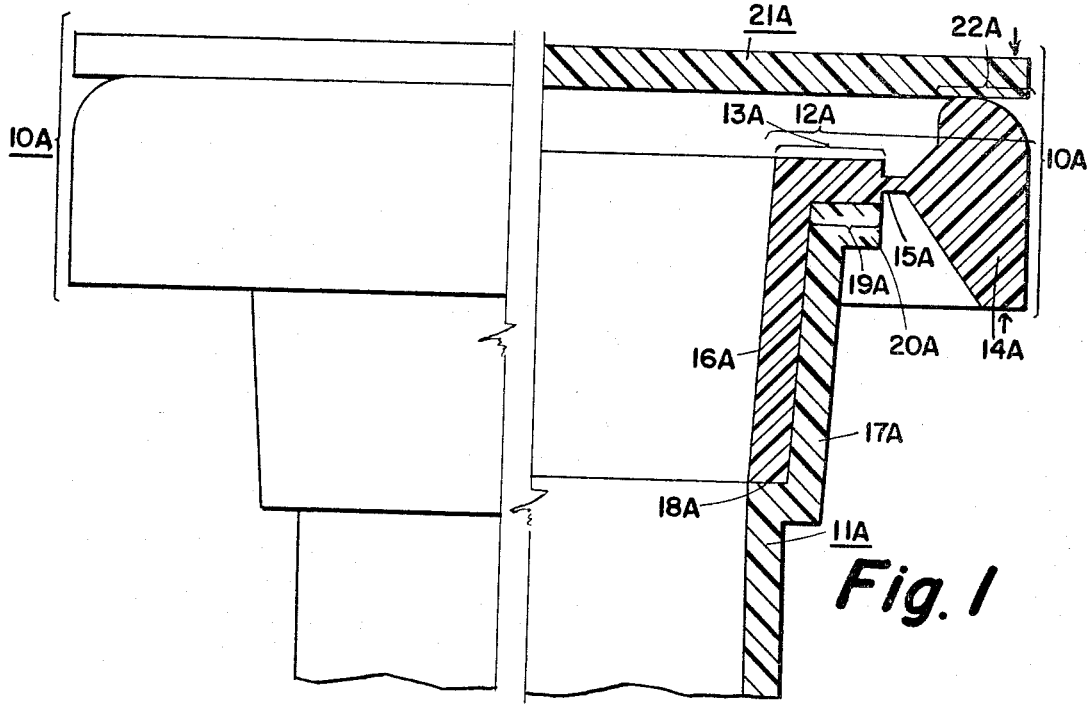
FIG. 1 is a side elevational view, partly in section, showing one form of the closure means as applied to a preformed container body.

Referring to FIG. 1, the closure means 10A for the container body 11A has a collar element 12A comprising a body-engaging portion 13A which is integrally joined to the tear-off rim 14A by the relatively thin rupture section 15A. In this modification, the body-engaging portion 13A of the collar comprises a sleeve 16A whose outer perimeter is shaped and dimensioned snugly to fit within the enlarged throat 17A of the container body. With the collar element applied, the lower edge of its sleeve 16A may engage a shoulder 18A of the throat 17A and the under surface of the flange 19A of the collar element engages the upper face of flange 20A extending outwardly from the open end of the container body.

The lid 21A of the closure means 10A is joined throughout its peripheral or marginal area 22A to the upper part of the tear-off rim 14A of collar 12A. For most applications, the lid may be and preferably is a separate element as shown; alternatively, the lid 21A may be integrally formed with collar 12A so that its marginal area 22A is integrally joined or merged with the tear-off rim 14A as the upper part of it. In either case, the collar 12A is preferably of a low tensile strength heat-sealing plastic, such as low-density polyethylene, and is preferably manufactured by an injection molding process.

With the collar 12A and lid 21A made as separate elements, the sleeve 16A of the collar 12A may be fitted into the open end of the container body 11A at any time after manufacture of the container body and before the filling of it with the intended contents. For some applications, the extensive area of frictional engagement between the sleeve 16A and the throat 17A of the container body may suffice. For most applications, such attachment between the collar 12A and the container body 11A is supplemented by sealing them together with adhesive, or preferably by heat-sealing them together by any suitable process, involving application or internal generation of heat, to effect mutual bonding of the contacting surfaces. After filling of the collared container body, the lid 21A is applied to overlie the open end with the marginal area 22A of the lid sealed, as by heat-sealing, to the tear-off rim 14A of the collar. The closure means 10A as formed by elements 12A, 21A now isolates the container contents from atmosphere for shipment and display.

Figure 1A:
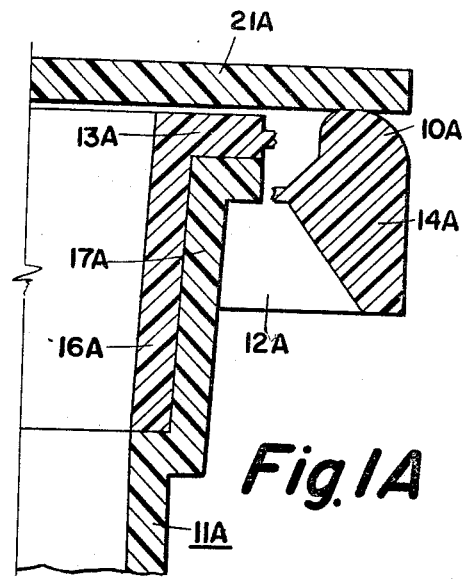
FIG. 1A is a fragmentary view showing the tear-off rim and attached lid as used to recap the unsealed container.

To unseal the container for use of all or some of its contents, no knife or other tool is necessary. For original access to the stored contents, it is only necessary to apply finger pressure to the rim 14A in either direction indicated by the arrows in FIG. 1. With the body-engaging portion of the otherwise deformable collar 12A stiffened by its attachment to the container body, the application of pressure to the rim 14A causes a localized deflection of lid 21A and rim 14A, with a consequent short break of the rupture section 15A near the applied pressure point. Then by lifting the rim 14A, the break progresses along the rupture section 15A. For complete removal of the rim 14A and the attached lid 21A as a re-usable cap cover, the rupture section 15A is continuous throughout the perimeter of flange area 19A of the body-engaging portion 13A of collar 12A: to afford a captive or hinged cap cover, the rupture section 15A is suitably short of the full perimeter of flange 19A. In either case, the tear-off rim 14A of the collar 12A, as joined to the lid 21A, now provides a re-closable cap cover usable to protect the partially depleted contents of the unsealed container (see FIG. 1A).

As above stated, the plastic collar 12A is preferably of low-density polyethylene and formed by injection molding. It may be attached to preformed container bodies whose size or other requirements can be better satisfied by other materials and other forming processes. The lid 21A, when separate from the collar 12A, may be of thermoplastic film cut from a web during its application and heat-sealed to the collar 12A, or it may be, as shown in FIG. 1, of thicker sheet thermoplastic precut to match the tear-off rim 14A of the collar element 12A.

In the modification of FIG. 1 shown in FIGS. 2–6 the corresponding elements are identified by the same reference numerals plus letter suffixes different for different figures of drawing. With such explanation, much of the preceding description of FIG. 1 is directly applicable to subsequent figures and need not be repeated.

Figure 2:
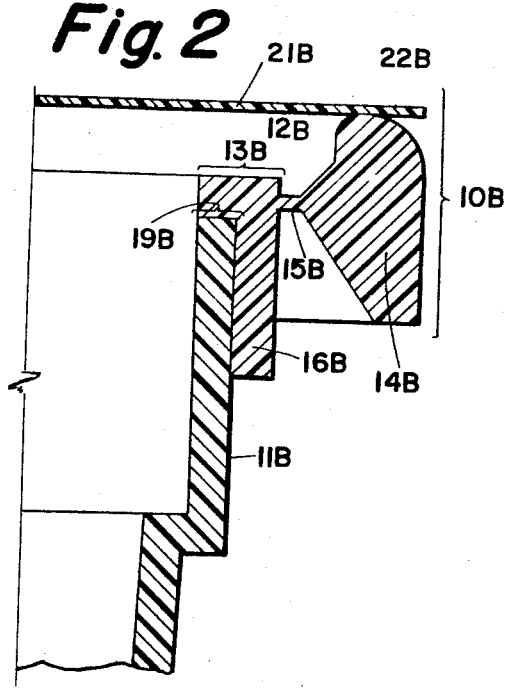

The closure means 10B of FIG. 2 is similar to that of FIG. 1 but differs in that the collar element 12B has an external sleeve 16B. The mouth of the container body 11B has no outer flange corresponding with flange 20A of FIG. 1 so that the external sleeve 16B of collar 12B tightly fits the outer perimeter of the preformed container body at and adjacent the open end thereof. With the relatively shorter sleeve of FIG. 2, the frictional attachment of the collar to the container body is preferably supplemented by a heat-seal. Since the seal is external to the container body 11B, the collar element 12B, with or without the lid 21B, can be applied and sealed to the container body after the filling thereof.

The closure means 10C of FIG. 3 is similar to that of FIG. 1 but differs in that the internal sleeve 16C of the collar element 12C is substantially shorter than sleeve 16A of FIG. 1. It, therefore, should be sealed to the inner face of the container body 11C. In FIG. 3, the lid 21C is shown as a thin film, i.e., of thickness ranging from about 1.5 to 3.0 thousandths of an inch, although it may be of substantial thickness, for example 10 to 20 thousandths of an inch as in FIG. 1. In either case, the lid is applied and sealed to the tear-off rim 14C of the collar element 12C subsequent to filling of the container.

The closure means 10D of FIG. 4 is similar to that of FIG. 3 but differs in that the body-engaging portion 13C of the collar element 12A embraces the flanged top edge of the container body 11D and that the rupture section 15D is formed by two deep opposed V-grooves. The collar 12D with its short inner sleeve 16D fitting inside the throat of the container body is sealed to it before filling. The lid 21D is applied and sealed to the tear-off rim 14D of the collar element 12D after filling of the container. The lid 21D may be either a sheet of substantial thickness as shown or may be of film.

The closure means 10E of FIG. 5 is similar to those previously described but differs in that the body-engaging portion 13E of collar element 12E simply abuts the top edge or rim flange 20E of the container body 11E and is lacking the inner or outer sleeves of the previously described modifications. In this modification, the collar element 12E, with or without the lid 21E, may be applied to the container body 11E before or after filling, depending upon the mode of attachment of the collar to the container body. If the collar element 12E is to be heat-sealed to flange 20E of the container body, the lid 21E is applied to the tear-off rim 14E of the collar element after the latter has been sealed to the container body and after filling of the container body with its intended contents.

The closure means 10F of FIG. 6 is similar to FIG. 1 except that the frictional engagement between the sleeve 16F of the collar element 12F and the throat of the container body 11F is supplemented by a mechanical lock, such as afforded by an interlocking bead-and-groove arrangement. Specifically in the construction shown in FIG. 6, when the deformable collar element 12F is pressed into the open top of the container body 11F, the peripheral bead 25 of the collar sleeve 16F snaps into the supplemental groove 26 of the container body 11F. With this modification, no adhesive or heat-sealing is used. Such attachment of the collar element 12F to the container body 11F may be effected either before or after filling of the container body and before or after application to the collar 12F of a separate lid 21F.

In this modification of FIG. 6, as in all others, the filled container may be unsealed for initial access to its contents, simply by applying pressure to the rim or bead of the collar element, first to break the rupture section intermediate the rim and body-engaging portions of the collar, and, then, progressively from the break, to tear off the rim with the lid remaining intact and sealed thereto. The lid and attached torn-off rim provide a re-usable cap cover for the unsealed container.

In general, for the modifications of FIG. 1 to 5, the generation of heat for mutual bonding of the contacting surfaces of the collar and container body may be effected by use of any of known processes, such as ultrasonic, spinning or microwave-sealing or application of heat by radiation or direct contact from an external heat source. Such heat-sealing of the collar to the preformed container body affords a good hermetic seal which is necessary for effective protection over an extended period of time of many perishables, such as fruit juices, solids and the like. For other applications where the container contents, such as milk, are usually used after only a short storage time, a tight frictional engagement, such as afforded by the sleeve 16A, 16F of FIGS. 1 and 6, suffices particularly when supplemented by a bead-groove lock (FIG. 6) to resist dislodgment of the collar by an accidental blow. Also with closure constructions such as shown in FIGS. 2 and 4, the plastic collar may be preheated and shrunk over the mouth of the container body to effect a seal approaching that of a hermetic heat-seal so far as tightness and resistance to passage of liquids or gases is concerned. When adhesives are used to join the collar and container body or to supplement a frictional seal, they must be carefully selected in view of the particular contents to avoid contamination.

It will be understood that the collar element of the closure means may be round, oval, square or other shape to match the open end or throat of the container body to which it is to be attached, and that the lid may be of similar outline to match the tear-off rim of the collar element.

What is claimed is:

1. Closure means for an open-ended container body comprising
   a deformable collar element having a body-engaging portion shaped and dimensioned to fit the open end of said container body and having a tear-off rim joined to said body-engaging portion of the collar element by a thin intermediate rupture section which can be broken by application of pressure to said rim when said collar element is stiffened by attachment to the container body.

2. Container-closure means as in claim 1 in which the body-engaging portion of said collar element comprises a flat inner border for abutting attachment to the upper face of the open end of the container body.

3. Container-closure means as in claim 1 additionally including
   a deformable lid joined throughout its marginal area to said tear-off rim of the collar element for attachment therewith as a unit to the contained body.

4. Container-closure means as in claim 3 in which the marginal area of the lid is an integral part of the tear-off rim of the collar element.

5. Container-closure means as in claim 1 in which the body-engaging portion of said collar element comprises a sleeve for telescoping with the container body at the open end thereof.

6. Container-closure means as in claim 5 in which the sleeve additionally has one element of a bead-and-groove lock for engagement with a complemental element of the container body.

7. A container comprising
   a container body having an open end, and
   a deformable collar element having a body-engaging portion attached to the open end of said container body and having a tear-off rim joined to its body-engaging portion by a thin intermediate rupture section which can be broken by pressure manually applied to said rim of the attached collar element.

8. A container as in claim 7 additionally including a deformable lid joined throughout its marginal area to the tear-off rim of the attached collar element.

9. A container as in claim 7 in which the body-engaging portion of the collar element comprises a sleeve in mating engagement with the container body.

10. A container as in claim 7 in which the body-engaging portion of the collar element comprises a sleeve fitting within the container body at its open end.

11. An container as in claim 7 in which the body-engaging portion of the collar element comprises a sleeve fitted around the container body at its open end.

12. A container as in claim 7 in which the body-engaging portion of the collar element comprises an inner marginal area attached to the upper face of the open end of the container body.

No references cited.

LOUIS G. MANCENE, *Primary Examiner.*

G. T. HALL, *Assistant Examiner.*